US008861942B2

(12) United States Patent
Rossiter et al.

(10) Patent No.: US 8,861,942 B2
(45) Date of Patent: Oct. 14, 2014

(54) VIDEO TABLET AND DOCKING STATION AND METHOD OF USE

(75) Inventors: Shane Rossiter, Marina del Rey, CA (US); Timothy P. Clegg, Manhattan Beach, CA (US)

(73) Assignee: Americhip, Inc., Los Angeles, CA (US)

( * ) Notice: Subject to any disclaimer, the term of this patent is extended or adjusted under 35 U.S.C. 154(b) by 127 days.

(21) Appl. No.: 13/470,998

(22) Filed: May 14, 2012

(65) Prior Publication Data
US 2013/0202269 A1 Aug. 8, 2013

Related U.S. Application Data

(60) Provisional application No. 61/594,940, filed on Feb. 3, 2012.

(51) Int. Cl.
*H04N 5/76* (2006.01)
(52) U.S. Cl.
USPC .......................................... 386/361; 386/358
(58) Field of Classification Search
None
See application file for complete search history.

(56) References Cited

U.S. PATENT DOCUMENTS

| D395,292 | S | 6/1998 | Vu |
|---|---|---|---|
| D450,059 | S | 11/2001 | Itou |
| D453,504 | S | 2/2002 | Bong et al. |
| D518,799 | S | 4/2006 | Peng |
| 7,209,124 | B2 | 4/2007 | Hunt et al. |
| D545,280 | S | 6/2007 | Imboden |
| D564,470 | S | 3/2008 | Chiu |
| D564,989 | S | 3/2008 | Kita |
| 7,359,624 | B2 | 4/2008 | Adams et al. |
| D578,973 | S | 10/2008 | Chiu |
| D600,244 | S | 9/2009 | Chiu |
| D608,746 | S | 1/2010 | Tu |
| D610,562 | S | 2/2010 | Chien |
| D644,655 | S | 9/2011 | McLaughlin et al. |
| D646,298 | S | 10/2011 | McLaughlin et al. |
| 2002/0016967 | A1 | 2/2002 | Carlile |
| 2002/0065719 | A1 | 5/2002 | Yamaguchi |
| 2003/0122864 | A1 | 7/2003 | Jenne et al. |
| 2003/0135390 | A1 | 7/2003 | O'Brien et al. |
| 2004/0025185 | A1 | 2/2004 | Goci et al. |
| 2004/0230725 | A1 | 11/2004 | Chen et al. |
| 2006/0224696 | A1 | 10/2006 | King et al. |
| 2009/0244832 | A1* | 10/2009 | Behar et al. .............. 361/679.55 |

(Continued)

FOREIGN PATENT DOCUMENTS

| JP | 2010-101949 | 5/2010 |
|---|---|---|
| KR | 2009037217 A | 10/2007 |

*Primary Examiner* — William C Vaughn, Jr.
*Assistant Examiner* — Eileen Adams
(74) *Attorney, Agent, or Firm* — Brennan C. Swain, Esq.; Jeffer Mangels Butler & Mitchell LLP

(57) ABSTRACT

A unit that includes a docking station and a tablet. The docking station includes a base having first and second docking recesses defined therein and docking station contacts positioned in at least the first docking recess. The tablet includes a housing having a video screen, a memory, at least one switch, and a power source positioned therein. The video screen, memory, at least one switch, and power source are in electrical communication and the housing includes first and second docking portions. At least the first docking portion includes tablet contacts thereon. The first and second docking portions of the tablet are positioned in the first and second docking recesses and the tablet contacts are in electrical communication with the docking station contacts. The tablet is removable from the docking station.

19 Claims, 8 Drawing Sheets

(56) References Cited

U.S. PATENT DOCUMENTS

| | | |
|---|---|---|
| 2010/0262435 A1 | 10/2010 | Smith et al. |
| 2010/0287001 A1 | 11/2010 | Pearce et al. |
| 2011/0016427 A1 | 1/2011 | Douen |
| 2011/0134602 A1* | 6/2011 | Tarnoff ................... 361/679.43 |
| 2011/0222466 A1* | 9/2011 | Pance et al. ................... 370/316 |
| 2012/0021808 A1 | 1/2012 | Tseng |
| 2012/0159337 A1* | 6/2012 | Travilla et al. ................ 715/738 |
| 2013/0088813 A1* | 4/2013 | Su et al. ................... 361/679.01 |

* cited by examiner

VIDEO TABLET AND DOCKING STATION AND METHOD OF USE

This application claims the benefit of U.S. Provisional Application No. 61/594,940, filed Feb. 3, 2012, which is herein incorporated by reference in its entirety.

FIELD OF THE INVENTION

The present invention relates to video tablet and docking station unit. More specifically, the present invention relates to video tablet and docking station unit that includes dedicated content that can be related to advertising indicia thereon or the location of the unit.

BACKGROUND OF THE INVENTION

Technology for including video and audio in printed materials has become simpler and cheaper in recent years. Video devices that are incorporated into apparel, greeting cards and the like are known. Portable video players have also become popular in recent years. However, many portable video players are expensive. A need exists for a video player that overcomes the drawbacks of the prior art.

SUMMARY OF THE PREFERRED EMBODIMENTS

In accordance with a first aspect of the present invention there is provided a unit that includes a docking station and a tablet. The docking station includes a base having first and second. docking recesses defined therein and docking station contacts positioned in at least the first docking recess. The tablet includes a housing having a video screen, a memory, at least one switch, and a power source positioned therein. The video screen, memory, at least one switch, and power source are in electrical communication and the housing includes first and second docking portions. At least the first docking portion includes tablet contacts thereon. The first and second docking portions of the tablet are positioned in the first and second docking recesses and the tablet contacts are in electrical communication with the docking station contacts. The tablet is removable from the docking station.

In a preferred embodiment, the docking station includes a support assembly connected to the base that supports the rear surface of the tablet. The support assembly is pivotally connected to the base and s movable between a support position and a stowed position. Preferably, the docking station includes a first bracket positioned in the first docking recess and a second bracket positioned in the second docking recess and the first and second docking portions of the tablet are received by the first and second brackets, respectively. The first and second brackets each include a hinge portion extending therefrom that is connected to the support assembly to allow the support assembly to pivot between the support and stowed positions. In a preferred embodiment, the tablet and docking station each include advertising indicia thereon that is related. Preferably, in the support position, at least a port of the support assembly is received in indentations defined in an inside concave surface of the base. The tablet includes at least first and second push button switches, the memory has at least first and second media stored therein, and when the first push button switch is pressed the first media plays on the video screen and when the second push button switch is pressed the second media plays on the video screen. Preferably, the housing includes front and rear covers secured thereto.

In accordance with another aspect of the present invention there is provided a method of playing a video. The method includes providing a docking station that includes a base having first and second docking recesses defined therein and a support assembly pivotal between a stowed position and a support position, pivoting the support assembly from the stowed position to the support position, positioning a tablet such that first and second docking portions of the tablet are received in the first and second docking recesses on the docking station and a rear surface of the tablet is supported by the support assembly of the docking station, and closing a first switch o le tablet that actuates a first video on the video screen.

In accordance with other aspect of the present invention, there is provided an assembly that includes a docking station that has a base having at least a first docking recess defined therein that includes docking station contacts positioned therein, and a tablet that includes a housing having a video screen, a memory, at least first and second switches, and a power source positioned therein. The video screen, memory, plurality of switches, and power source are in electrical communication, and the memory includes at least first and second videos stored therein. The first video is associated with the first switch and the second video is associated with the second switch.

The video tablet and docking station can include advertising or be specifically branded as desired. In another embodiment, the branding and content can be related. In another embodiment, the branding content and location of the tablet and docking station can be related. For example, the tablet and docking station can include advertising for a dental office, include video content related to the dental office and can be positioned in the dental office e.g., on the table in the waiting room).

The invention, together with additional features and advantages thereof, may be best understood by reference to the following description.

DETAILED DESCRIPTION OF THE PREFERRED EMBODIMENTS

Figure 1:
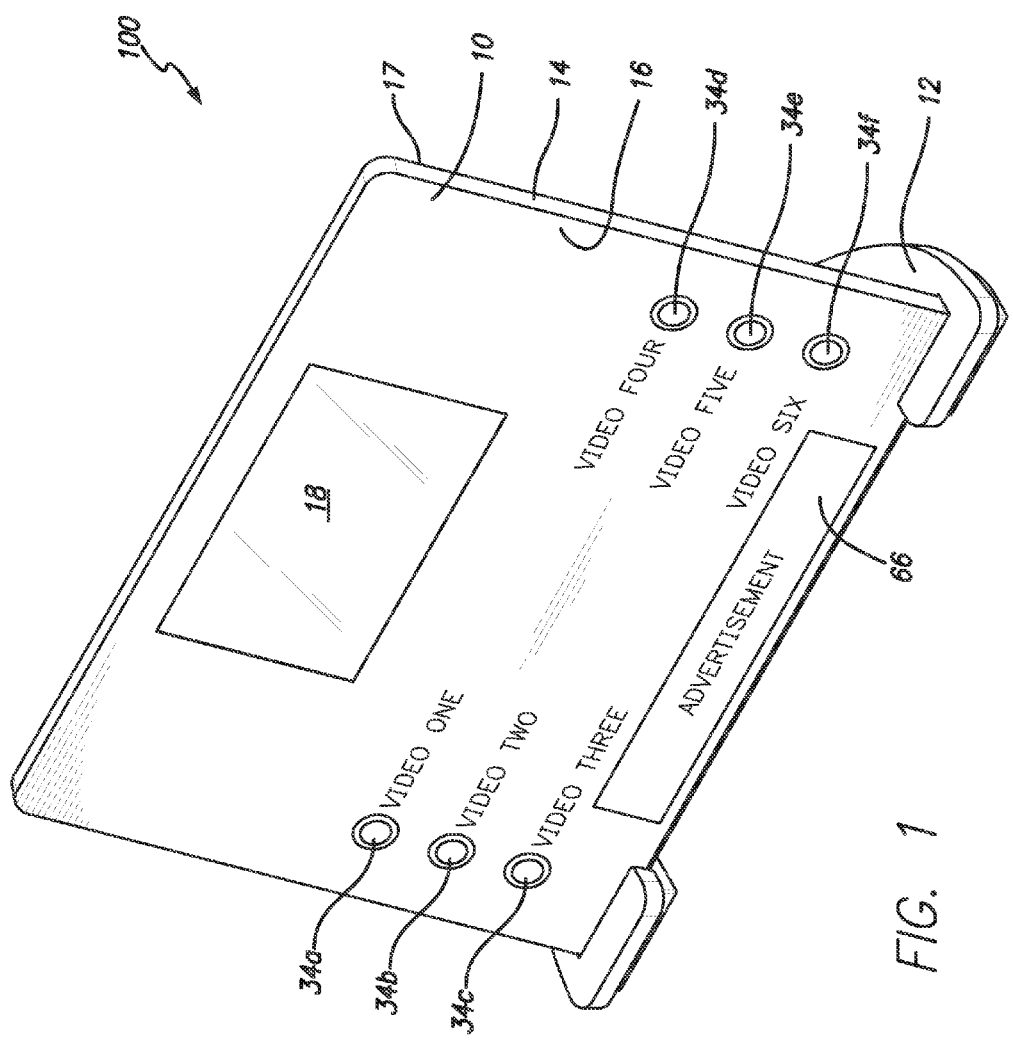
FIG. 1 is a perspective view of a video tablet and docking station unit in accordance with an embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may he used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the seismic actuators and the components thereof described herein is within the scope of the present invention.

Referring now to the drawings, wherein the showings are for purposes of illustrating the present invention and not for purposes of limiting he same, FIGS. 1-7 show a unit 100 that includes a video tablet 10 and docking station 12. In a preferred embodiment, the tablet 10 includes a housing 14 having a front cover 16 and a rear cover 17 that house components that together cooperate to play video and/or audio content on a video screen 18. U.S. Pat. No. 8,011,122, issued Sep. 6, 2011, which teaches video player technology is incorporated by reference herein in its entirety.

Figure 2:
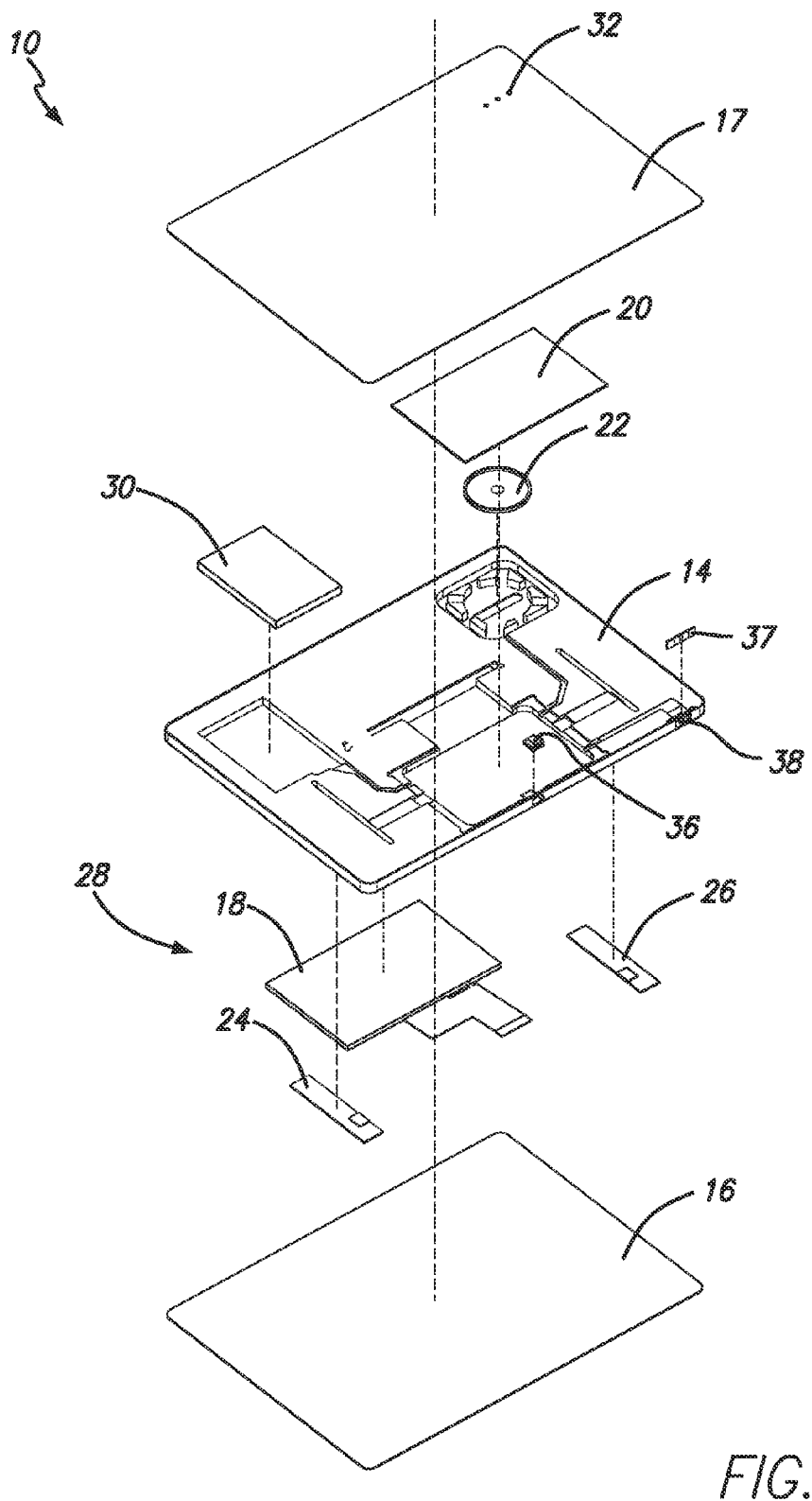
FIG. 2 is an exploded perspective view of the video tablet of FIG. 1.

In a preferred embodiment, as shown in FIG. 2, housed within or mounted on housing 14, front cover 16 and rear cover 17 is a printed circuit board (PCB) assembly 20, a speaker 22, a right switch assembly 24, a left switch assembly 26, an LCD assembly 28 (which includes video screen 18), and a battery 30 or other power source. As shown in FIG. 1, in a preferred embodiment, the housing 14 includes openings, slots or indentations in which the various components are received. However, this is not a limitation on the present invention. As necessary, the various components are in electrical communication via wires and the like.

Figure 3:
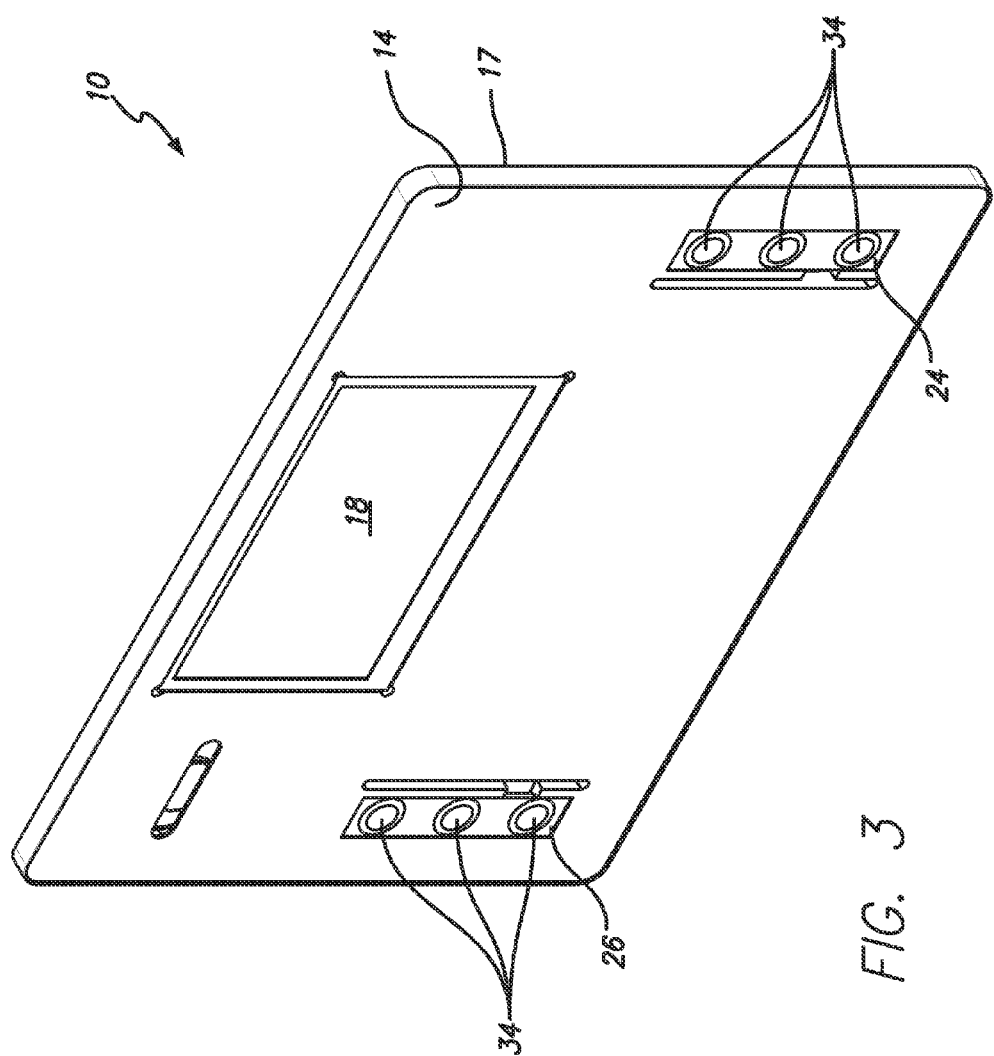
FIG. 3 is a perspective view of the video tablet of FIG. 1 with the front cover removed.

In a preferred embodiment, the back cover 17 includes openings 32 therein that are aligned with the speaker 22 and through which sound is emitted. Preferably, the front cover 16 is comprised of a clear material, such as polycarbonate so that the video screen 18 can be seen therethrough. As shown in FIG. 3, in a preferred embodiment, the right and left switch assemblies 24 and 26 include a plurality of push button switches 34, respectively. The number of buttons and the type of switch is not a limitation on the present invention. However, as shown in FIG. 3, in a preferred embodiment, the tablet 10 includes three buttons 34 on each side.

As shown in FIG. 2, in a preferred embodiment, the tablet 10 includes a USB port 36, which can be used for charging the bane 30 or uploading or downloading data. The tablet 10 also preferably includes battery charging capability when docked with the docking station 12. In a preferred embodiment, the tablet 10 includes a DC contact PCB (referred to herein as "tablet contacts") 37 that is aligned with openings 38 in the bottom surface of the housing 14. As described below, the tablet contacts 37 mate with contacts in the docking station 12.

Figure 4:
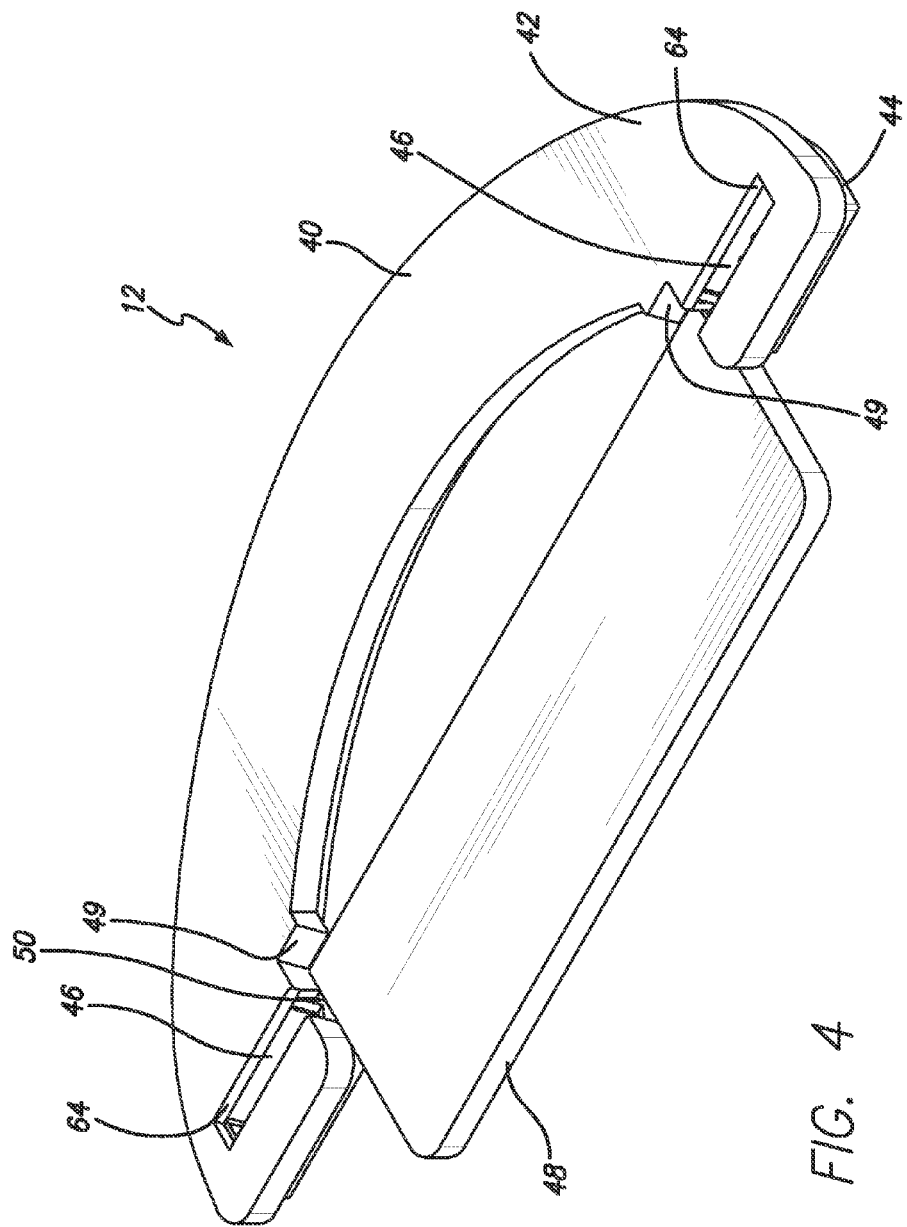
FIG. 4 is a perspective view of the docking station of FIG. 1 with the support assembly in a stowed position.
Figure 5:
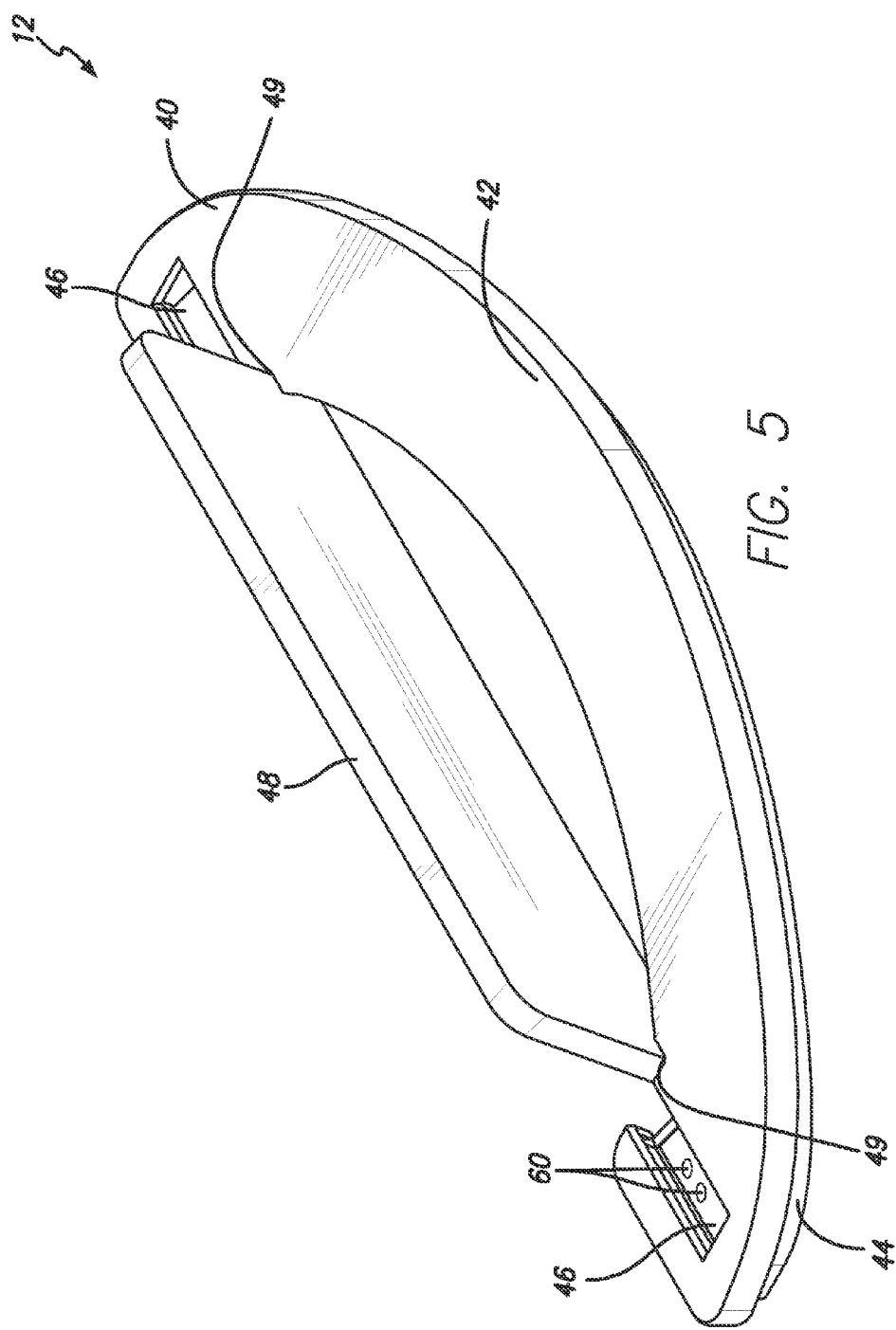
FIG. 5 is a perspective view of the docking station of FIG. 1 with the support assembly in a docking position.
Figure 6:
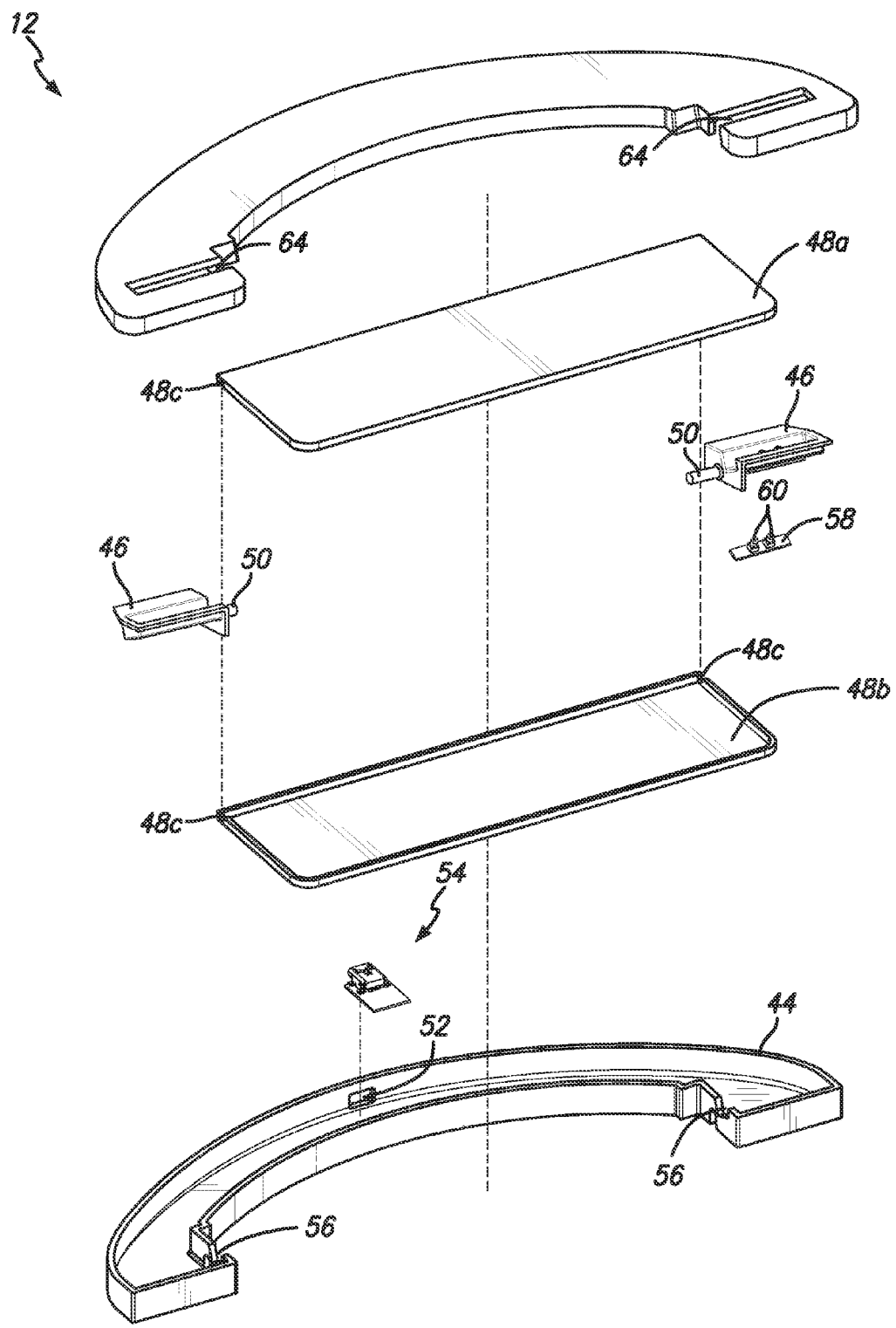
FIG. 6 is an exploded perspective view of the docking station of FIG. 1.

Referring to FIGS. 4-6, the docking station 12 includes base 40 having a main body portion 42 and a base bottom 44, left and right (or first and second) brackets 46 and a support assembly 48. In a preferred embodiment, the support assembly 48 is hingedly attached to the base 40 by left and right brackets 46. As shown in FIG. 6, in a preferred embodiment, support assembly 48 includes first and second support members 48*a* and 48*b* that are secured together and that sandwich a hinge portion 50 of the brackets 46 therebetween. Preferably, the support members 48*a* and 48*b* include indentations 48*c* that cooperate to define an opening through which the hinge portion 50 of the brackets 46 extend.

In a preferred embodiment, the base 40 has a generally arcuate shape and includes an inside concave surface 40*a* and an outside convex surface 40*b*. When docked, the tablet 10 spans the space defined by the inside concave surface. The base bottom 44 preferably includes an opening 52 for receiving a USB port assembly 54, and troughs 56 in which the hinge portions 50 of the brackets 46 are seated. Base bottom 44 also includes an interior that houses some of the electrical components, such as wires that run from the USB port assembly 54 to the docking station contacts. The USB port assembly 54 can be used for plugging the docking station into a wall outlet (via a cord) for charging of the battery 30 of the docked tablet 10 or for uploading or downloading data to the docked tablet 10. It will be appreciated by those skilled in the art that component 54 does not ha o be a USB port, but can be any electro-mechanical connector known in the art. In another embodiment, the power cord can be permanently connected to the docking station 12 or can be plugged in as needed. Left and right brackets 46 are disposed within the interior, as shown in FIG. 5. In a preferred embodiment, a spring contacts PCB 58 is positioned below right bracket 46, such that spring contacts or docking station contacts 60 extend upwardly through openings 62 defined in the left bracket (as shown in FIG. 5). It will be appreciated that any method of charging the battery 30 in the tablet 10 is within the scope of the present invention and any type of charging components can be used. For data transfer spring contacts PCB 58 can include two more docking station contacts. For example, these components can include metal plates, prongs, contacts, sockets, etc. and other components known for charging.

Figure 8:
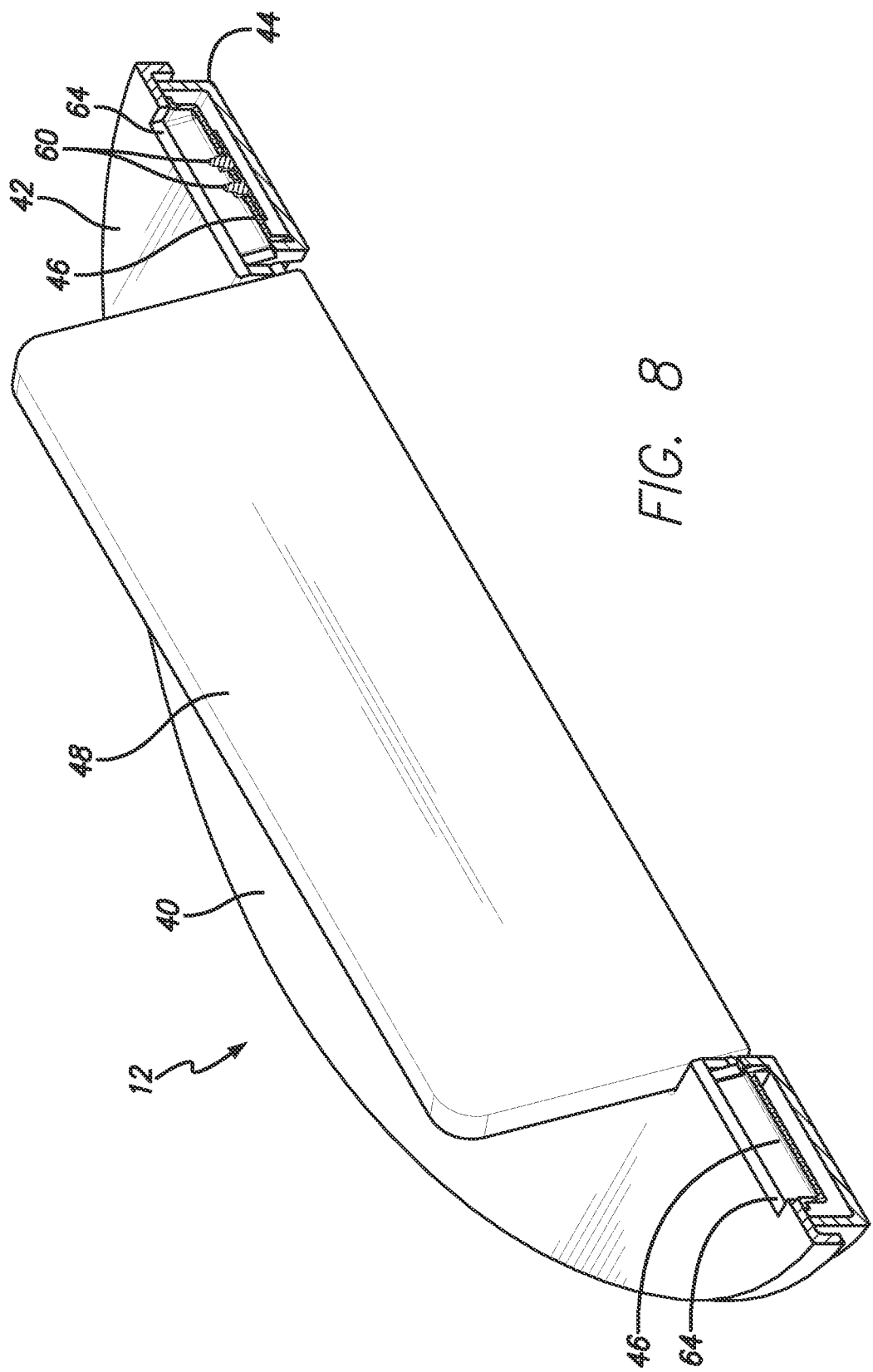
FIG. 8 is a cross-sectional perspective view of the docking station.

Main body portion 42 is positioned over and secured to base bottom 44 (as shown in FIG. 8) and is positioned over the brackets 46, such that they are at leas partially received in and aligned with first and second docking recesses 64 defined in the main body portion 42.

As shown in FIGS. 4-5, support assembly 48 is pivotal between a docking position and a stowed position. In the docking position, the support assembly 48 is positioned in indentations 49 defined in the inside concave surface 40a of base 40 and it helps support the tablet 10 when it is docked with the docking station 12. In the stowed position, the support assembly 48 together with the remainder of the docking station 12 has a low profile, which may be useful in storage, shipping, etc.

Figure 7:
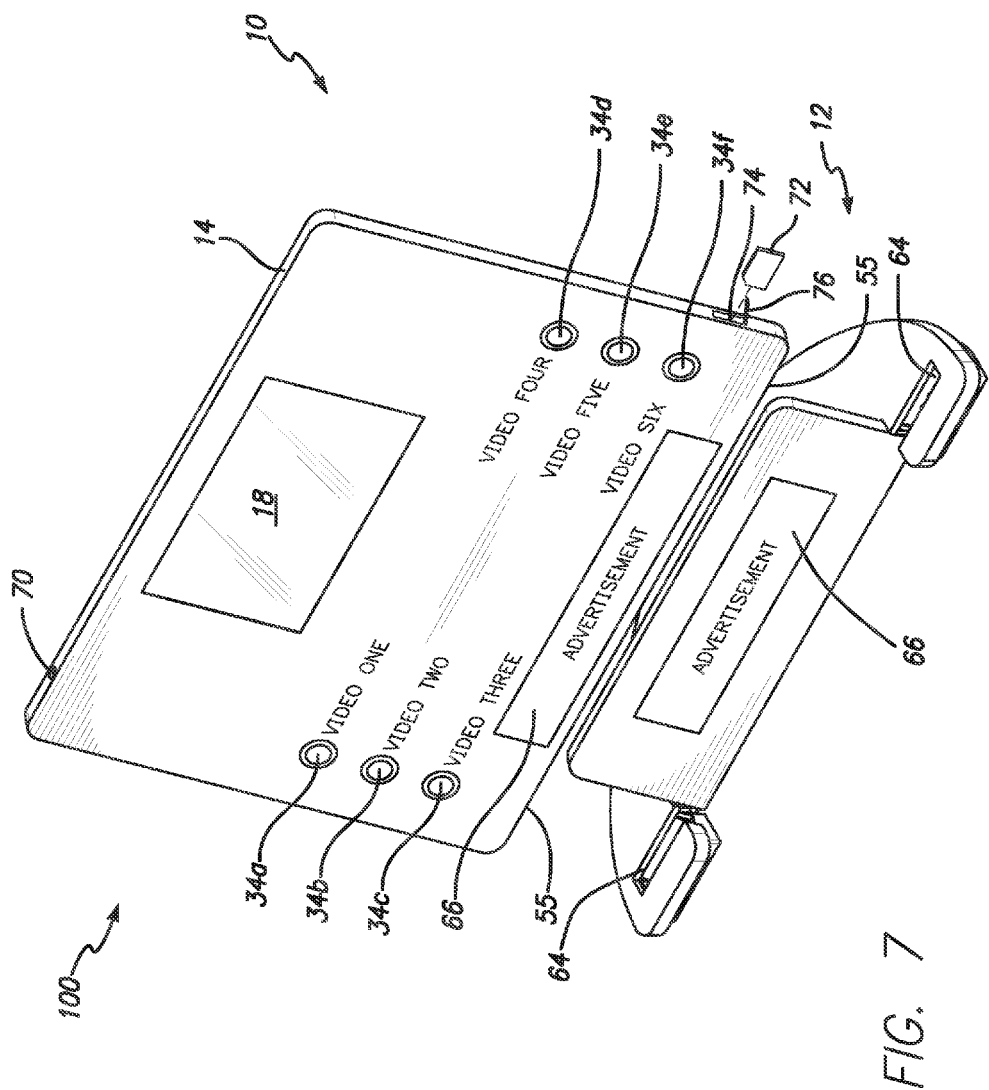
FIG. 7 is an exploded perspective view of the video tablet and docking station unit of FIGS. 1.

As discussed above, the tablet 10 includes at least one video screen 18. The video and/or audio is stored on memory in the PCB assembly 20. In another embodiment, as shown in FIG. 7, the tablet 10 can include an SD card 72 or similar removable memory device that is inserted into a slot 74 on the side of the tablet 10. The slot 74 can include a door 76 that is hingedly or otherwise connected to the tablet 10 and can be opened and closed. In an exemplary embodiment, the door 76 can include a thumb notch for opening the door 76 and a friction button can be used to release the SD card 72 from the slot 74. Any type of removable memory card arrangement is within the scope of the present invention. In a preferred embodiment, the buttons 34 operate separate videos (the buttons in general are all referred to herein generically as 34 and individually as 34a-34f). In other words, when a button is pushed, a video associated with that button plays on the screen 18. In another embodiment, the tablet 10 can include touch screen technology and buttons/switches 34 can be integrated with LCD assembly 28 and/or video screen 18.

In another embodiment, a switch or button can be designated for recording audio or video. The recorded videos can supplement those already prerecorded in the memory or can overwrite the existing videos. In a preferred embodiment, the new videos are recorded through the use of a suitable connector such as the USB assemblies/ports 36 or 54 shown in FIG. 4, although any suitable connection port may be used. Thereafter when the designated switch/button is activated, the new video will be played back. Thus, the present invention has the ability to play pre-recorded videos and is able to download new content to supplement a pre-recorded video, or download overtop of the pre-recorded with a new video, as well as the ability to recharge the battery 30 for repeated playing of the video.

In an exemplary embodiment, each of the buttons 34a, 34b, 34c, 34d, 34e and 34f has a predetermined (pre-recorded) video associated therewith. Accordingly, the first predetermined media (also referred to herein as video one is associated with button 34a.

It will be appreciated by those skilled in the art that buttons 34a-34f each have a different predetermined media associated with them (also referred to her in as videos two through six). Each of the buttons 34a-34f actuates a switch that is associated with predetermined media stored in the memory. Accordingly, the second predetermined media is associated with button 34b, the third predetermined media is associated with button 34c, the fourth predetermined media is associated with button 34d, the fifth predetermined media is associated with button 34e, and the sixth predetermined media is associated with button 34f. It will be understood that the number of buttons and/or media pieces or clips is not a limitation o present invention.

In use, as described above, when a button 34 (e.g., button 34c-video three) is pressed (thereby closing a switch), the video/media associated with that button begins to play. When any one of the other buttons 34a, 34b, 34d, 34c or 34f is pressed, video three will stop playing and the video associated with the depressed button will begin to play. Generally, any type of video screen that is thin and can be incorporated into tablet 10 is within the scope of the present invention.

As described above, the video screen 18 can include LCD (liquid crystal display) technology. However, this is not a limitation on the present invention The video screen 18 can be any type of video screen technology known in the art, such as monochrome, electro-chromic, TFT (thin film transistor), OLED (organic light emitting diode), CSTN (color super-twist nematic), DSTN (double layer STN, dual scan STN), FRSTN (fast response STN), FSTN (film compensated STN, formulated STN or filtered STN), FFSTN (double film super-twist nematic), MSTN (monochrome super-twist nematic), active-matrix electrophoretic display e-ink) or any other video screen technology now known or later developed.

In another embodiment, instead of including a plurality of buttons a single button that cycles through the plurality of videos can be used.

In an exemplary use of the invention, the tablet 10 can include content associated with the location in which the unit 100 is placed. For example, the unit 100 could be placed in a doctor's office. In this example, each of the buttons 34 can activate a video related to the doctor's office or include general medical information. The buttons 34 can, for example, include information on prescriptions, the doctor's bio, office hours, what to expect during treatment, etc. The unit 100 can be placed in the waiting room or in an exam room.

Moreover, the unit 100 can include advertising thereon. For example, advertising indicia 66 can be placed on the tablet 10, the docking station 12 and/or the support assembly 48. The advertising may or may not be associated with or related to the location of the unit.

in another embodiment, the memory of the tablet 10 can contain prerecorded media, such as advertising for a prescription drug, but can also include the capability of recording new videos or downloading new videos as well (e.g., related to the specific doctor's office where the unit 100 is located). For example, a pharmaceutical company could give units 100 away to doctor's offices that each include an add for a pre-scription drug as video one. Each doctor's office can then customize videos two through six. In other words, in an example, the PCB assembly 20 includes a gigabyte of memory and includes a prerecorded video that takes up 100 megabytes of memory. This prerecorded video is "locked in" and cannot be erased. However, the memory still includes 900 megabytes of free memory that the user can use to record whatever they desire. In this embodiment, the card may include a button or buttons that are specifically devoted to the recording and playback of bonus materials.

The media clips can be recorded into memory by the user by pressing a button and recording audio and/or vide(as described above), inserting a flash/thumb drive, etc. to either of the USB ports 36 or 54 to either download to memory or to play directly from the memory of the drive.

In another exemplary use of the invention, the tablet 10 can include instructional videos. For example, the unit 100 can be mounted inside a vending machine. When the time comes for the machine to be filled, placed into use or repaired, the tablet 10 can be removed from the docking station 12 and the various buttons can include videos instructing a user how to set up the vending machine for use or how to repair different aspects of the machine. In another embodiment, the docking station can be omitted and the tablet 10 can be mounted within and connected to the vending machine itself (via a USB cable or the like) for data transfer, battery charging, etc. This provides a removable training device.

In other embodiments, the tablet 10 and/or docking station 12 can include a headphone jack 70 (see FIG. 7), on/off switch or volume control. In different embodiments, the tablet 10 can include different types of on/off switches. For example, one of the buttons 34 can be an on/off switch that either completely powers down the unit or puts the unit in a "sleep" mode where minimal power is used. The tablet 10 can also include an on/off switch on the side or face of the tablet 10 that completely powers down the unit. In another embodiment, the tablet 10 can include both an on/off switch associated with one of the buttons 34 that places the unit into a sleep mode and a master on/off switch that turns all power off. In an embodiment, the tablet 10 can include a pull tab (not shown) positioned between the battery and a contact to keep the circuit open. The pull tab can be removed by a user when the tablet 10 is ready to be used. This can be used, for example, during shipping of the device.

Accordingly, the unit can be shipped to a user with the pull tablet positioned in the tablet 10 to keep the circuit open and with the support 48 on the docking station 12 in the stowed position. Once the unit 100 is removed from the shipping materials, the user pulls the tab from the tablet 10, moves the support 48 to the docking position, and places the tablet 10 in the docking station 12, such that at least two portions of the tablet 10 (referred to herein as the first and second docking portions 55—see FIG. 7) are positioned in the first and second docking recesses 64 and on (or received in) the brackets 46.

It will be understood that the basic configuration of the present invention includes the printed circuit board assembly, speaker, batteries and a video screen. Playing of a video can be actuated in a number of different ways, including a slide tongue (if the tablet has a cover or the like), push button, motion sensor, light sensor, magnets, etc. And this can be done to play one or a series of videos. Another embodiments can include a slide tongue actuating the first video and push buttons for actuating other videos. In another embodiment, the slide tongue can be omitted and a plurality of push buttons or other actuation methods (described above) can actuate the videos. In another embodiment, the slide tongue can be omitted and a single push button or other actuation method can be used to cycle through a plurality of videos. In yet another embodiment, the user can download additional information from a computer or other memory storage device to overwrite any pre-recorded messages. In yet another embodiment, the user can download additional information from a computer or other memory storage device in addition to unerasable, pre-recorded messages that still play back even after the additional information has been added by the user.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Description of the Preferred Embodiments using the singular or plural number may also include, the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may he performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An assembly comprising:
   a docking station that includes a base having first and second docking recesses defined therein, wherein at least the first docking recess includes docking station contacts positioned therein, and
   a tablet that includes a housing having a video screen, a memory, at least one switch, and a power source positioned therein, wherein the video screen, memory, at least one switch, and power source are in electrical communication, wherein the housing includes first and second docking portions, and wherein at least the first docking portion includes tablet contacts thereon, wherein the tablet contacts are in electrical communication with the power source, wherein the first and second docking portions of the tablet are positioned in the first and second docking recesses and the docking station contacts are in electrical communication with the tablet contacts and the tablet contacts are in electrical communication with the power source, and wherein the tablet is removable from the docking station.

2. The assembly of claim 1 wherein the docking station includes a support assembly connected to the base, wherein a rear surface of the tablet is supported by the support assembly.

3. The assembly of claim 2 wherein the support assembly is pivotally connected to the base and is movable between a support position and a stowed position.

4. The assembly of claim 1 wherein the docking station includes a first bracket positioned in the first docking recess and a second bracket positioned in the second docking recess, wherein the first and second docking portions of the tablet are received by the first and second brackets, respectively.

5. The assembly of claim 4 wherein the docking station includes a support assembly pivotally connected to the base that is movable between a support position and a stowed position.

6. The assembly of claim 5 wherein the first and second brackets each include a hinge portion extending therefrom, wherein the hinge portions are connected to the support assembly such that the support assembly is pivotal between the support and stowed positions.

7. The assembly of claim 1 wherein the tablet and docking station each include advertising indicia thereon, and wherein the advertising indicia is related.

8. The assembly of claim 1 wherein the base has a generally arcuate shape and includes an inside concave surface and an outside convex surface.

9. The assembly of claim 8 wherein the docking station includes a support assembly pivotally connected to the base that is movable between a support position and a stowed position, and wherein in the support position, at least a portion of the support assembly is received in indentations defined in the inside concave surface of the base.

10. The assembly of claim 1 wherein the tablet includes at least first and second push button switches, wherein the memory has at least first and second media stored therein, wherein the first media is associated with the first push button switch, wherein the second media is associated with the second push button switch, and wherein when the first push button switch is pressed the first media plays on the video screen and when the second push button switch is pressed the second media plays on the video screen.

11. The assembly of claim 10 wherein the housing includes front and rear covers secured thereto.

12. The assembly of claim 11 wherein the front cover is transparent.

13. A method of playing a video on a tablet contained in a docking station, the method comprising the steps of:
   providing a docking station that includes a base having first and second docking recesses defined therein and a support assembly pivotal between a stowed position and a support position, pivoting the support assembly from the stowed position to the support position, positioning a tablet such that first and second docking portions of the tablet are received in the first and second docking recesses on the docking station and a rear surface of the tablet is supported by the support assembly of the docking station after the support assembly has been pivoted to the support position,
   and closing a first switch on the tablet contained in the docking station that actuates a first video on the video screen.

14. The method of claim 13 further comprising the step of closing a second switch on the tablet that actuates a second video on the video screen.

15. The method of claim 13 wherein the docking station includes a first bracket positioned in the first docking recess and a second bracket positioned in the second docking recess, wherein the first and second docking portions of the tablet are received by the first and second brackets, respectively.

16. The method of claim 15 wherein the first and second brackets each include a hinge portion extending therefrom, wherein the hinge portions are connected to the support assembly such that the support assembly is pivotal between the support and stowed positions.

17. An assembly comprising:
   a docking station that includes a base having at least a first docking recess defined therein, wherein the first docking recess includes docking station contacts positioned therein, and
   a tablet that includes a housing having a video screen, a memory, at least first and second switches, and a power source positioned therein, wherein the video screen, memory, plurality of switches, and power source are in electrical communication, wherein the memory includes at least first and second videos stored therein, and wherein the first video is associated with the first switch and the second video is associated with the second switch, wherein the tablet includes at least a first docking portion that includes tablet contacts thereon, wherein the tablet contacts are in electrical communication with the power source, and wherein when the first docking portion is positioned in the first docking recess, the docking station contacts are in electrical communication with the tablet contacts and the tablet contacts are in electrical communication with the power source.

18. The assembly of claim 17 wherein the tablet and docking station each include advertising indicia thereon, and wherein the advertising indicia is related.

19. The assembly of claim 10 wherein the first and second push button switches are mechanically actuated push button switches.

* * * * *